A. KRIESCHER.
HOSE COUPLING.
APPLICATION FILED JUNE 3, 1922.
1,436,317.
Patented Nov. 21, 1922.
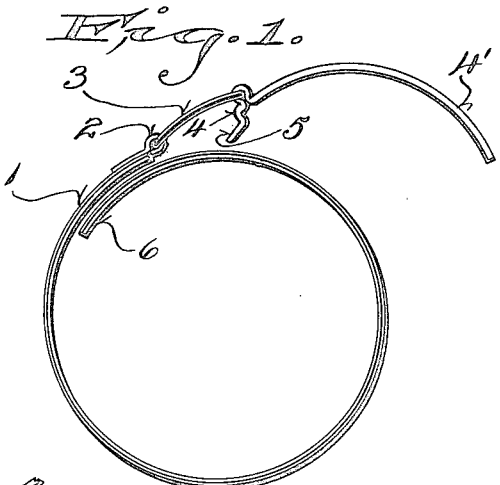
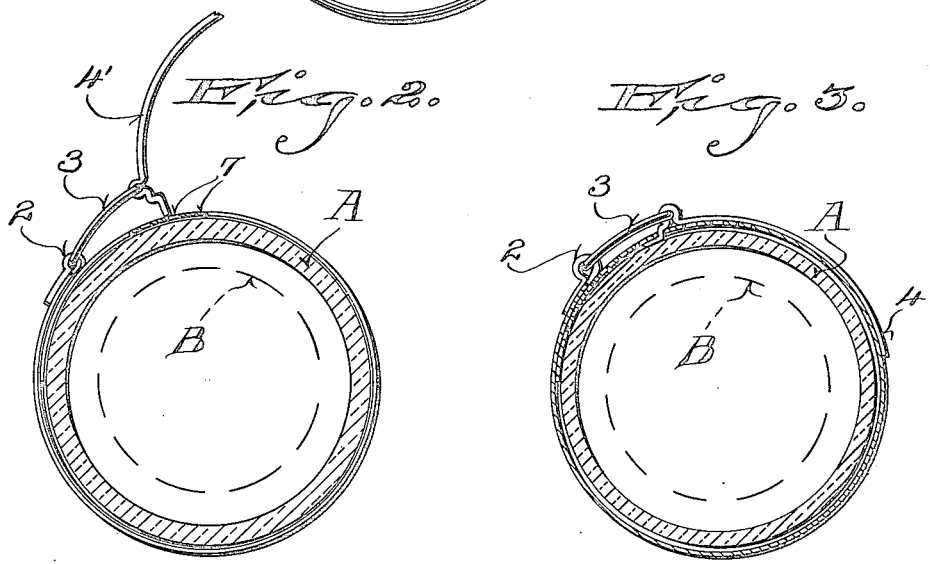
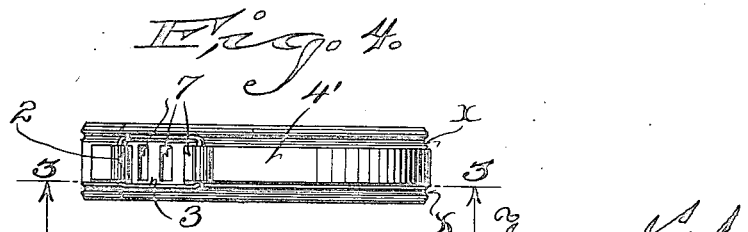
Witness:
Erwin B. Eiring
Inventor:
Alwin Kriescher
By
Attorneys Patented Nov. 21, 1922.

1,436,317

UNITED STATES PATENT OFFICE.

ALWIN KRIESCHER, OF GREEN BAY, WISCONSIN.

HOSE COUPLING.

Application filed June 3, 1922. Serial No. 565,778.

*To all whom it may concern:*

Be it known that I, ALWIN KRIESCHER, a citizen of the United States, and resident of Green Bay, in the county of Brown and State of Wisconsin, have invented certain new and useful Improvements in Hose Couplings; and I do hereby declare that the following is a full, clear, and exact description thereof.

My invention refers to a flexible hose coupling or clamp, and it has for its object to provide a simple, economical, and effective hose coupling, the construction and arrangement being such that a flexible band having lapped ends and a lever locking connection can be adjusted and locked tightly about the hose sections varying in diameter.

The specific object of my invention is to provide the band with an apertured end adapted to underlap the outer end of said band in conjunction with a circular lever in link connection with the outer end of the band, the short arm of said lever having a foot for engagement with any one of the band apertures, whereby said foot, in locking engagement, will impinge against the surface of the hose and force the inner lapped end of the band in frictional contact with the juxtaposed surface of the outer band end, whereby a final draw of the parts is effected to securely lock the band element about the hose and its associated connection to form a water-tight joint by simply operating or swinging down the locking lever connection.

Another object of my invention is to produce a flexible band coupling and a locking mechanism therefor, which can be manufactured at a minimum cost and which will meet with all of the requirements of a coupling of this general type.

With the above and other minor objects in view, the invention consists in certain peculiarities of construction and combination of parts, as will be hereinafter set forth with reference to the accompanying drawings and subsequently claimed.

In the drawings:—

Figure 1 represents a front elevation of a coupling band embodying the features of my invention, the same being shown in its open detached position.

Figure 2 is a similar view of the band adjusted about a flexible hose section and in position to be drawn up and locked to effect a tight joint between the hose section and a pipe nipple over which the hose is fitted.

Figure 3 is a similar, sectional view showing the hose coupling in its locked position, a section being indicated by line 3—3 of Figure 4, and Figure 4 is a face view of a coupling element, with parts shown in locked position.

Referring by characters to the drawings, 1 represents the over-lapped locking end of a flexible metallic band, which is circumferentially beaded, as indicated at $x$ in Figure 4, to add strength thereto. Secured to the over-lapped locking end of the band is an eye 2, carrying one stretch of an oscillatory link 3. The outer or free end stretch of the link is pivotally connected to a locking lever, having a short arm 4 and a long arm 4', the said lever being circular in shape.

Pivotal connection between the link and lever is formed by up-setting, or bowing, the body of the lever about the outer stretch of the link 3, whereby a fulcrum for said lever results. It will be observed that the long arm of the lever 4' is described upon a circle corresponding to the circle of the exterior face of the band body and the short arm is off-set downwardly and extended in an arc concentric with that of the arm 4' to form a flat gripping foot 5. The inner under-lapped end 6 of the band is provided with a series of transversely arranged rectangular slots 7 for the reception of the gripping foot 5 of the locking lever.

As best shown in Figure 2 of the drawings, when the band or clutch is fitted about a flexible hose section A, the foot of the locking lever is forced into engagement with a selected slot 7, and thereafter the long arm of the lever is forced down to its closed position, as best shown in Figure 3. In swinging to the locking position, the gripping foot will pass through the slot 7 and its bottom flat face will engage the outer surface of the hose section and it will slide in a wedging connection between the outer face of the hose section and the inner face of the band end 6, whereby said band end is forced outwardly and caused to spread radially and to thereby frictionally engage the under surface of the over-lapped locking end of the band.

Thus it will be seen that a final draw of the parts is effected as the locking member is brought to its snug, nested position, in connection with the band, whereby all parts are securely tightened and the slip joint between the hose section and the metallic nipple B fitted therein will be hermetically sealed. Obviously the band is of such proportions as to permit adjustment for various sized hose sections, and it will also be observed that when the parts are firmly locked, there are no abrupt projections to catch into the locking mechanism, whereby it may inadvertently become loosened, bearing in mind that the link 3, which forms a fulcrum for the locking lever, will, when the parts are in their locked position, hold the device compactly and securely to the gripped surfaces.

While I have shown and described a single exemplification of my invention, it is understood that I may vary the features of it within the scope of the claim.

I claim:

A hose clamp comprising a resilient, metallic open-ended band having an over-lapped locking end and an under-lapping end in frictional engagement with the over-lapping end, the under lapping end being provided with a series of rectangular slots, an eye extending from the over-lapped locking end, a link carried by the eye, a circular short and long armed locking lever pivotally secured to the free end of the link, a gripping foot extending from the short arm of the lever, the same including a toe portion off-set and dropped below the plane of the long arm of the lever and adapted to enter a selected band slot to lie parallel with the inner surface of the band and to rest upon the surface of the clamped hose section to exert an inwardly and wedging strain upon the band, whereby the same is drawn snugly about the hose when the long arm of said band is forced inwardly and nested against the surface of the band in its locked position.

In testimony that I claim the foregoing I have hereunto set my hand at Green Bay, in the county of Brown and State of Wisconsin.

ALWIN KRIESCHER.